United States Patent
Patterson

(10) Patent No.: US 9,909,401 B2
(45) Date of Patent: Mar. 6, 2018

(54) METHOD OF FLASH-COOLING PRODUCED WATER AND HEATING STEAM GENERATOR FEEDWATER

(71) Applicant: Veolia Water Technologies, Inc., Moon Township, PA (US)

(72) Inventor: Mark D. Patterson, Aurora, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 220 days.

(21) Appl. No.: 14/821,073

(22) Filed: Aug. 7, 2015

(65) Prior Publication Data

US 2016/0047218 A1    Feb. 18, 2016

Related U.S. Application Data

(60) Provisional application No. 62/036,708, filed on Aug. 13, 2014.

(51) Int. Cl.
| | |
|---|---|
| *E21B 43/24* | (2006.01) |
| *C02F 1/06* | (2006.01) |
| *C02F 1/04* | (2006.01) |
| *C02F 1/40* | (2006.01) |
| *C02F 101/32* | (2006.01) |
| *C02F 103/10* | (2006.01) |
| *C02F 103/36* | (2006.01) |

(52) U.S. Cl.
CPC ............... *E21B 43/24* (2013.01); *C02F 1/06* (2013.01); *C02F 1/041* (2013.01); *C02F 1/048* (2013.01); *C02F 1/40* (2013.01); *C02F 2101/32* (2013.01); *C02F 2103/10* (2013.01); *C02F 2103/365* (2013.01); *C02F 2209/005* (2013.01); *C02F 2209/02* (2013.01); *C02F 2209/03* (2013.01); *C02F 2301/063* (2013.01)

(58) Field of Classification Search
CPC .................................. E21B 43/24; C02F 1/06
See application file for complete search history.

(56) References Cited

U.S. PATENT DOCUMENTS

| | | | |
|---|---|---|---|
| 3,824,155 A | 7/1974 | Takada | |
| 6,733,636 B1 * | 5/2004 | Heins | C02F 1/04 159/24.1 |
| 7,077,201 B2 * | 7/2006 | Heins | C02F 1/04 159/24.1 |
| 7,150,320 B2 * | 12/2006 | Heins | E21B 43/2406 159/24.1 |
| 7,578,345 B2 * | 8/2009 | Minnich | B01D 1/26 166/267 |
| 7,597,144 B2 * | 10/2009 | Minnich | B01D 17/02 166/266 |
| 7,905,283 B2 * | 3/2011 | Minnich | E21B 43/24 166/266 |
| 8,469,092 B2 * | 6/2013 | Curole | B01D 61/027 166/266 |
| 8,789,608 B2 * | 7/2014 | Betzer-Zilevitch | B03D 1/02 122/6 R |

(Continued)

FOREIGN PATENT DOCUMENTS

WO    2009029653 A1    3/2009

*Primary Examiner* — Matthew R Buck
(74) *Attorney, Agent, or Firm* — Coats & Bennett PLLC

(57) ABSTRACT

An oil recovery process where produced water is cooled through a flash evaporization process and the resulting vapor is utilized to heat steam generator feedwater.

31 Claims, 4 Drawing Sheets

(56) References Cited

U.S. PATENT DOCUMENTS

| | | | | |
|---|---|---|---|---|
| 8,899,326 B2* | 12/2014 | Vasudevan | ................ | C02F 9/00 |
| | | | | 122/6 R |
| 9,328,601 B2* | 5/2016 | Chen | ....................... | E21B 43/40 |
| 2010/0038081 A1* | 2/2010 | Gamache | .............. | C02F 1/5245 |
| | | | | 166/267 |
| 2010/0275600 A1 | 11/2010 | Speirs et al. | | |
| 2011/0139603 A1 | 6/2011 | Booth | | |
| 2011/0259586 A1* | 10/2011 | Latimer | .................. | E21B 43/16 |
| | | | | 166/275 |
| 2012/0145386 A1 | 6/2012 | Bjorklund et al. | | |

* cited by examiner

METHOD OF FLASH-COOLING PRODUCED WATER AND HEATING STEAM GENERATOR FEEDWATER

This application claims priority under 35 U.S.C. § 119(e) from the following U.S. provisional application: Application Ser. No. 62/036,708 filed on Aug. 13, 2014. That application is incorporated in its entirety by reference herein.

FIELD OF THE INVENTION

The present invention relates to recovering oil from oil bearing geologic formations and more specifically to treating produced water and efficiently producing steam generator feedwater.

BACKGROUND

Enhanced oil recovery (EOR) processes employ thermal energy to facilitate the recovery of oil, particularly heavy oil, from oil-bearing geologic formations. One particular process for recovering heavy oil is referred to as steam-assisted gravity drainage (SAGD). In the SAGD process, steam is injected into the oil-bearing formation to supply thermal energy to mobilize the heavy oil. Generally, several tons of steam is required for each ton of oil recovered by the process. Injected steam heats the oil bound in the formation, and this heating lowers the viscosity of the oil. Heat from the steam comes from sensible heat as the steam cools and latent heat as the steam condenses into water. The lowered viscosity of the oil enables the oil to mix with the water, producing an oil-water mixture which may flow to collection areas and ultimately be pumped to the surface. The oil is recovered by substantially removing it from the oil-water mixture leaving a so-called produced water. The produced water is generally very warm or hot as well as being laden with contaminants in the form of suspended solids, dissolved solids, and dissolved gases. The contaminants often include compounds such as dissolved silica, hardness-producing materials, and materials giving rise to alkalinity.

It is known to process the produced water to clean the water, even if the water is to be discharged or wasted in that regulatory compliance generally requires treatment to render the water safe for discharge into surface water, for example. However, it is common to treat the produced water such that the produced water can be utilized as a feedwater to a steam generator or boiler. In the steam generator or boiler, the treated produced water is converted to steam for reuse in a SAGD process, for example. This practice is important because of the cost of water. Generating steam generator feedwater from the produced water involves substantial cleaning of the produced water to improve the quality of the water and render the water acceptable for use as feedwater for steam generation. In some cases, produced water as it is delivered from the geologic formation is too hot for optimal produced water cleaning processes so that some cooling of the produced water may be needed to remove the excess thermal energy. Excess thermal energy in produced water may be of value in pre-heating steam generator feedwater and thereby reducing the energy demand for steam generation.

Cooling of produced water and the utilization of produced water to pre-heat steam generator feedwater is typically undertaken using liquid-to-liquid heat exchange where hot produced water is directed to one side of a heat exchanger and steam generator feedwater is directed to an opposite side of the heat exchanger. Through contact with heat exchange surfaces within the heat exchanger, heat is transferred from the produced water to the steam generator feedwater. Cooled produced water and pre-heated steam generator feedwater result. However, due to the nature of typical contaminants in produced water this approach is fraught with performance problems. Contaminants form foulants in the produced water. These foulants tend to precipitate and foul the heat exchange surfaces on the produced water side of the heat exchanger resulting in degraded heat transfer effectiveness and requiring service interruptions for cleaning.

There is a need for improved methods of cooling hot produced water by transferring excess heat from produced water to pre-heat steam generator feedwater while avoiding the problems of scaling or fouling typical of liquid-to-liquid heat transfer.

SUMMARY OF THE INVENTION

The present invention relates to an oil recovery process where produced water is cooled through a flash evaporation process and the resulting vapor is utilized to preheat steam generator feedwater.

In one embodiment, the present invention entails a method for recovering oil from an oil-bearing formation. The method includes recovering an oil-water mixture from the oil-bearing formation. Oil is separated from the oil-water mixture to produce oil and produced water. The produced water is subjected to an evaporation process where a portion of the produced water is evaporated to produce a vapor. Heat from the vapor is transferred to steam generator feedwater to preheat the steam generator feedwater. Thereafter, the feedwater is directed to a steam generator that produces steam that is injected into an oil well or an injection well.

In another embodiment, the present invention includes a system for cooling produced water separated from a recovered oil-water mixture and preheating the steam generator feedwater used for generating steam for injection into an oil-bearing formation or into an injection well. The system comprises an oil-water separation unit for receiving the recovered oil-water mixture and separating oil from the oil-water mixture to produce oil and the produced water. The system also includes one or more flash evaporators for receiving the produced water and cooling the produced water by flash evaporating the produced water to produce vapor and cooled produced water. There is also provided one or more heat exchangers or condensers for receiving the vapor produced by the one or more flash evaporators. A steam generator is included for generating steam for injection into an oil-bearing formation or injection well. Feedwater for the steam generator is directed through one or more heat exchangers prior to reaching the steam generator where heat is transferred from the vapor to the steam generator feedwater passing through the heat exchangers.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

DESCRIPTION OF THE INVENTION

Figure 1:
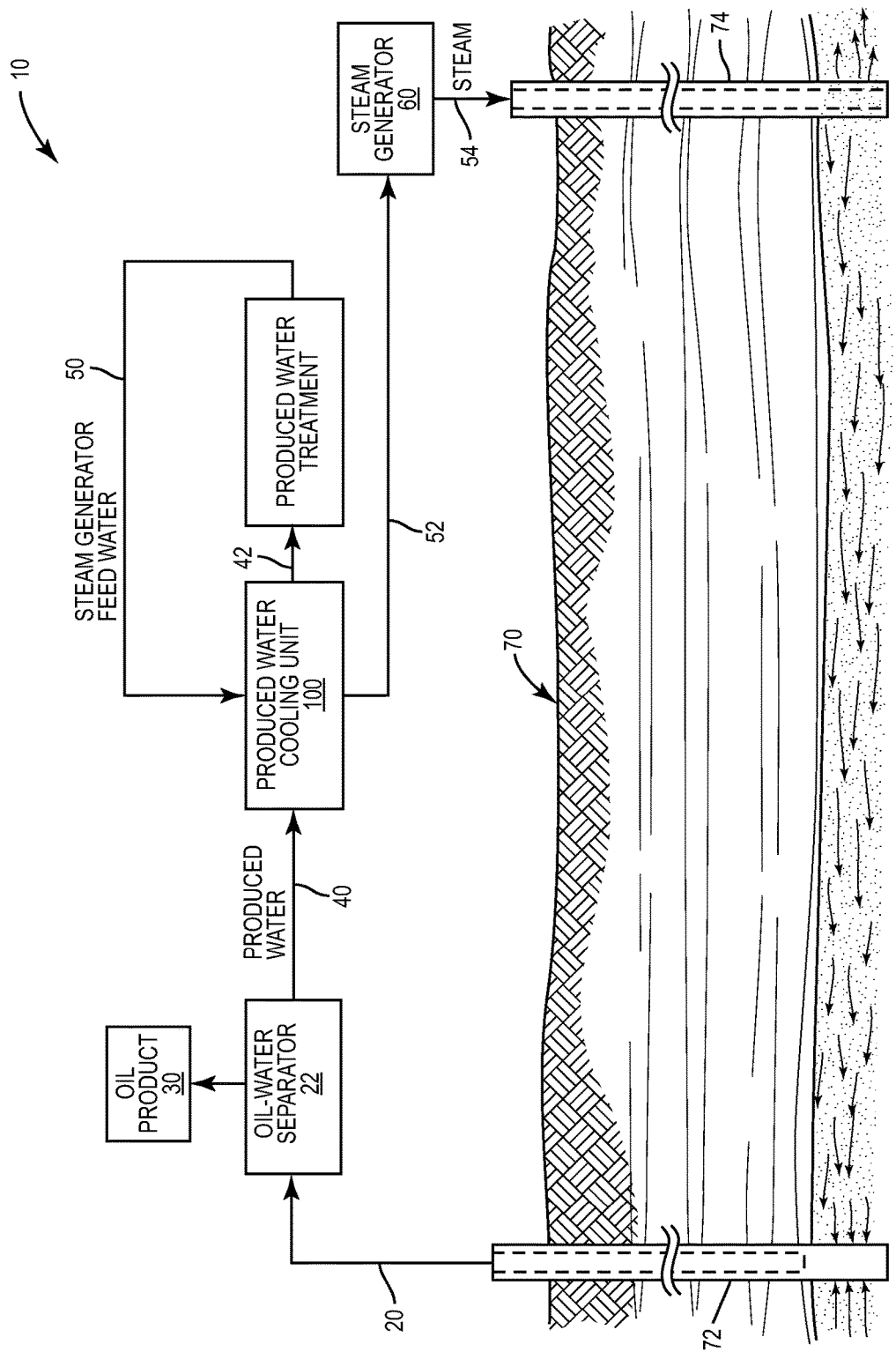
FIG. 1 is a schematic representation of an oil recovery system in which produced water is utilized to pre-heat steam generator feedwater.

The present invention provides improved methods of cooling produced water and pre-heating steam generator feedwater while avoiding problems related to fouling of heat transfer surfaces. In one embodiment, a SAGD oil recovery process, indicated generally by the numeral 10, includes recovering an oil-water mixture 20 from an oil-bearing formation 70 as shown in FIG. 1. The SAGD process for oil recovery relies on injecting energy, generally in the form of steam into the oil-bearing formation to thin and loosen the oil material bound within the formation and mobilize the oil by mixing the oil with hot water from condensing the steam. The recovered oil-water mixture 20, which is generally quite hot, is directed to a separator 22 where a product oil 30 is extracted from the oil-water mixture leaving produced water 40. Various oil-water separation systems may be employed in separator 22. For example, gravity or centrifugal separating devices may be used to generate the recovered oil product 30 and produced water 40 from oil-water mixture 20. Additionally, while not illustrated in FIG. 1, in some cases separator 22 may be followed by a de-oiling unit for further recovery of oil. The recovered oil product 30 may be further treated to produce petroleum products for use or sale. Due to the relatively high temperature of produced water 40, it is desirable to cool the water to some extent before further treatment. For this purpose, produced water 40 is directed to a produced water cooling unit 100 where the produced water is cooled by transferring heat to a steam generator feedwater 50. Various configurations of cooling unit 100 is discussed in detail below. However, a fundamental approach to cooling produced water is to exchange heat between produced water 40 and incoming steam generator feedwater 50. This process produces cooled produced water 42, which can be further treated and re-used or appropriately wasted. The process has the added feature of improving the efficiency of steam generation, as steam generator feedwater 50, in cooling produced water 40, is pre-heated in advance of its use for steam generation. Pre-heated steam generator feedwater 52 is directed to a steam generator 60 where steam 54 is generated. Steam 54 is injected into formation 70 via injection well 74 to mobilize oil in the formation as discussed above. The oil is heated by thermal energy from steam 54, reducing the viscosity of the oil. In this process, steam 54 condenses, forming hot liquid water which mixes with the oil. Oil is thus mobilized as an oil-water mixture 20, which is extracted via production well 72.

Figure 2:
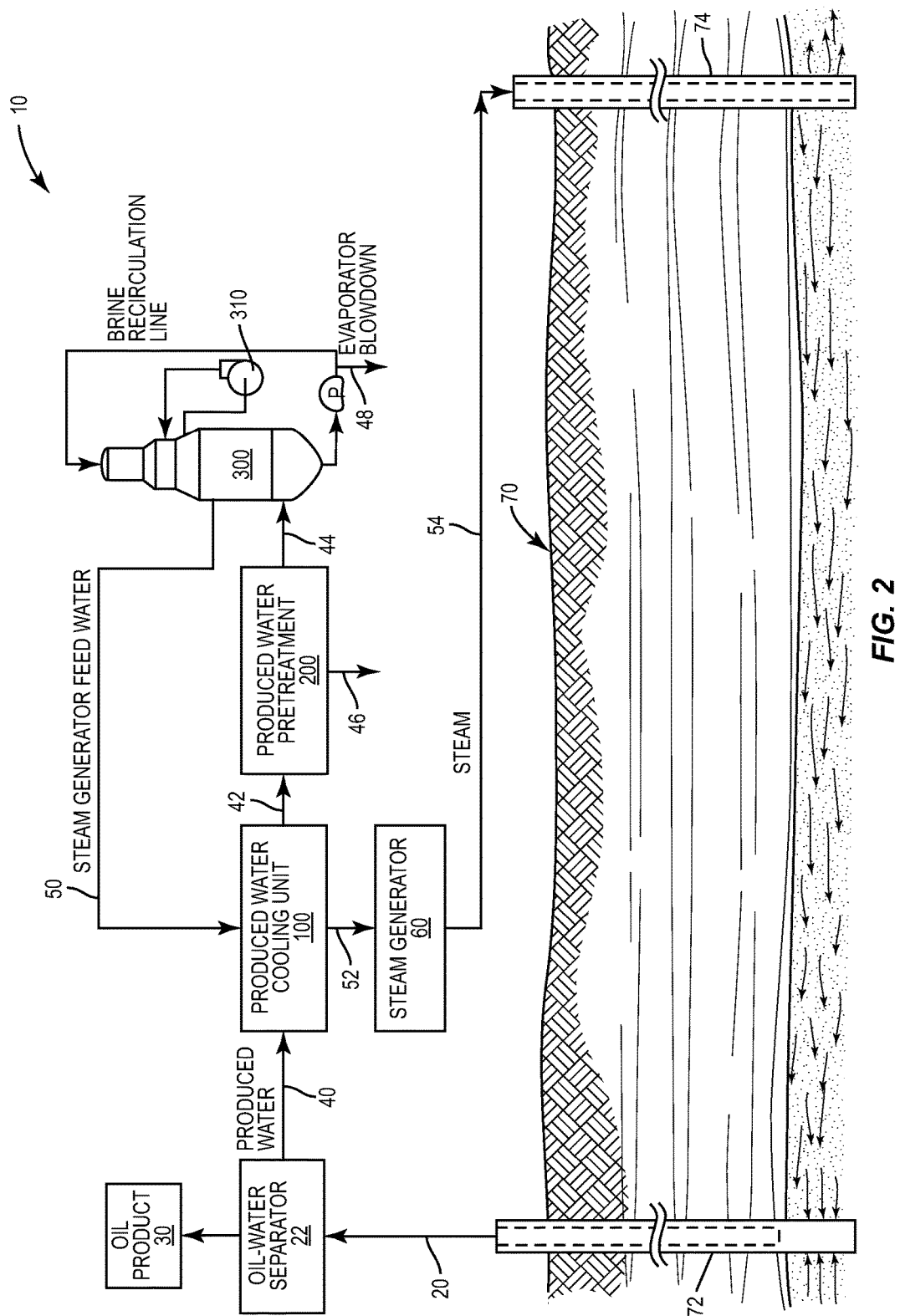
FIG. 2 is a schematic representation of a produced water cooling and treatment process in which produced water which is utilized to pre-heat steam generator feedwater.

In another embodiment of a SAGD oil recovery process, illustrated in FIG. 2 and referred to generally by the numeral 10, produced water 40, as generated from separator 22, is directed to produced water cooling unit 100 where the produced water is cooled and steam generator feedwater 50 is preheated. Preheated steam generator feedwater 52 is directed to steam generator 60 from whence steam 54 is injected into well 74 as discussed above. Cooled produced water 42 generally retains contaminants that were present in produced water 40. These contaminants often include suspended solids, dissolved solids, and dissolved gases. Further, it is quite often the case that the contaminants include dissolved silica, hardness-producing compounds, and compounds giving rise to alkalinity. Even when the cooled produced water 42 is to be wasted, some treatment is commonly required to bring the water into regulatory compliance for appropriate discharge or wasting. More often, due to the cost of water to make steam for injection, the produced water is reused by treating the water such that the quality of the water complies with standards for use in steam generators. FIG. 2, illustrates a process where produced water is reused to generate water for steam generation. As illustrated in FIG. 2, cooled produced water 42 is directed to a pretreatment unit 200 where various of the contaminants are separated from the water and removed in a pretreatment or reject stream 46 while pretreated produced water 44 is directed from the unit. Contaminant stream 46 may be wasted, stored, or further treated. It should be noted that in some cases certain contaminants are not actually removed from the produced water. Instead, the produced water is treated so as to reduce or eliminate the adverse effects of the contaminants. For example, in some cases, one or more reagents are added to the produced water to increase the pH of the produced water to maintain silica compounds soluble such that the silica compounds do not scale downstream process equipment. This is just one example of a pretreatment process that conditions the produced water to avoid adverse effects of certain contaminants. Pretreated water 44, in this embodiment, is directed to an evaporator 300 from which a distillate forming generator feedwater 50 is produced as well as an evaporator blowdown. The evaporator blowdown may be subjected to further treatment.

Regarding pretreatment and evaporation of cooled produced water 42, there are many known processes which may be employed. Pretreatment unit 200 may comprise any of a number of known systems for removing various contaminants from produced water. For example, pretreatment unit 200 may comprise one or more membranes such as ceramic membranes. Ceramic membranes, when employed, filter the cooled produced water 42 by removing suspended solids and precipitated solids as well as any remaining free oil, grease and even emulsified oil that may have been retained in the produced water. A permeate stream from the ceramic membranes forms a filtered produced water. As a further option, weak acid cation exchange (WAC) processes may be included in pretreatment unit 200 to further clean the filtered produced water. The WAC processes may operate, for example, in a sodium mode to remove hardness. As another example, WAC processes may operate in a hydrogen mode to simultaneously remove hardness and alkalinity. These are only examples of various types of pre-treatment processes that can be employed to treat the cooled produced water 42 prior to encountering downstream process equipment. In any event, the treated effluent from the produced water pretreatment unit 200 in this embodiment is directed to evaporator 300.

Evaporator 300 serves to evaporate water from the cooled and pre-treated produced water 44 directed thereto. Vapor produced by the evaporator 300 is condensed to produce a distillate which forms the steam generator feedwater 50. Steam generator feedwater 50 is directed to cooling unit 100 to cool produced water 40 and to, in the process, become preheated as previously indicated. A remaining concentrated brine or evaporator blowdown 48 is rejected as needed from evaporator 300 and stored, further treated, or disposed appropriately.

In one embodiment, evaporator 300 includes mechanical vapor recompression wherein vapor liberated within the evaporator is directed to a compressor 310 and thence back to the evaporator, providing added energy for evaporation. The cooled and pre-treated produced water 44 is directed into evaporator 300 where the water forms a brine that is continuously recirculated from the bottom or sump of the evaporator to the top of the evaporator by a pump P. The recirculated brine is directed downwardly within tubes descending from an upper portion of the evaporator 300. As the brine falls through the tubes, a portion of the water therein is evaporated due to heat energy provided by steam supplied to the outer surfaces of the tubes. The unevaporated brine falls into the lower portion of the evaporator, or into the sump, from whence it is recirculated by recirculation pump P. A portion of the vapor is directed into a mechanical vapor recompression loop where energy is added to the vapor to produce the steam that is directed to the outer surfaces of the tubes to heat and partially evaporate the brine flowing within the tubes. As the steam heats the brine, condensation of the steam results, producing a distillate which forms the steam generator feedwater 50.

Turning now to produced water cooling unit 100, it is appreciated that the unit is most generally a heat transfer device. Cooling unit 100 receives relatively cool steam generator feedwater 50 and relatively hot produced water 40. Thermal exchange processes enabled by and effected in cooling unit 100 transfer heat from produced water 40 to steam generator feedwater 50. Cooled produced water 42 and preheated steam generator feedwater 52 are thus produced and may be directed from cooling unit 100 to pre-treatment unit 200 and steam generator 60, respectively. One embodiment of cooling unit 100 is illustrated in FIG. 3, and a second embodiment of the cooling unit is illustrated in FIG. 4.

Figure 3:
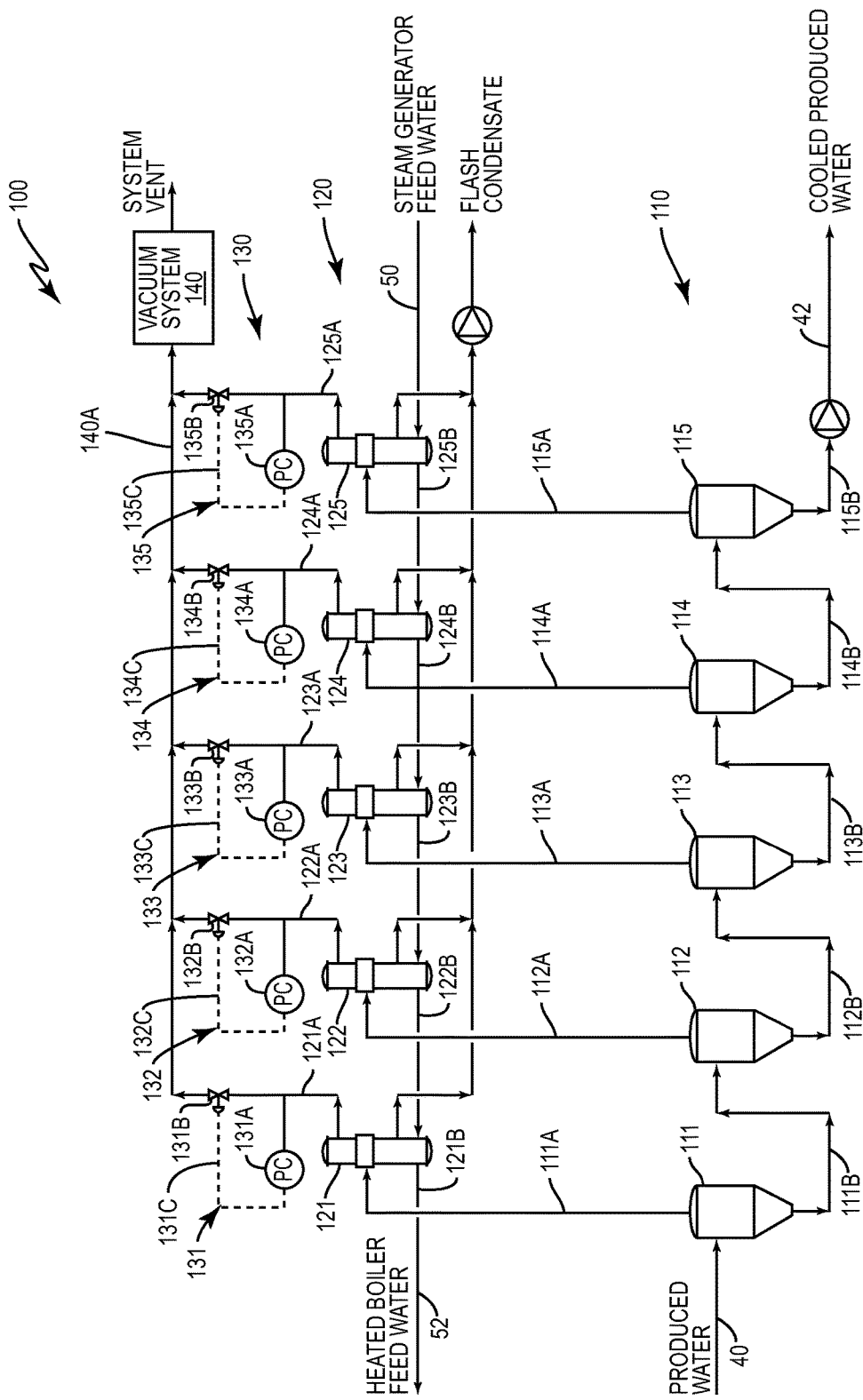
FIG. 3 is a schematic representation of a system for utilizing produced water to pre-heat steam generator feedwater by non-contact, indirect heat transfer.
Figure 4:
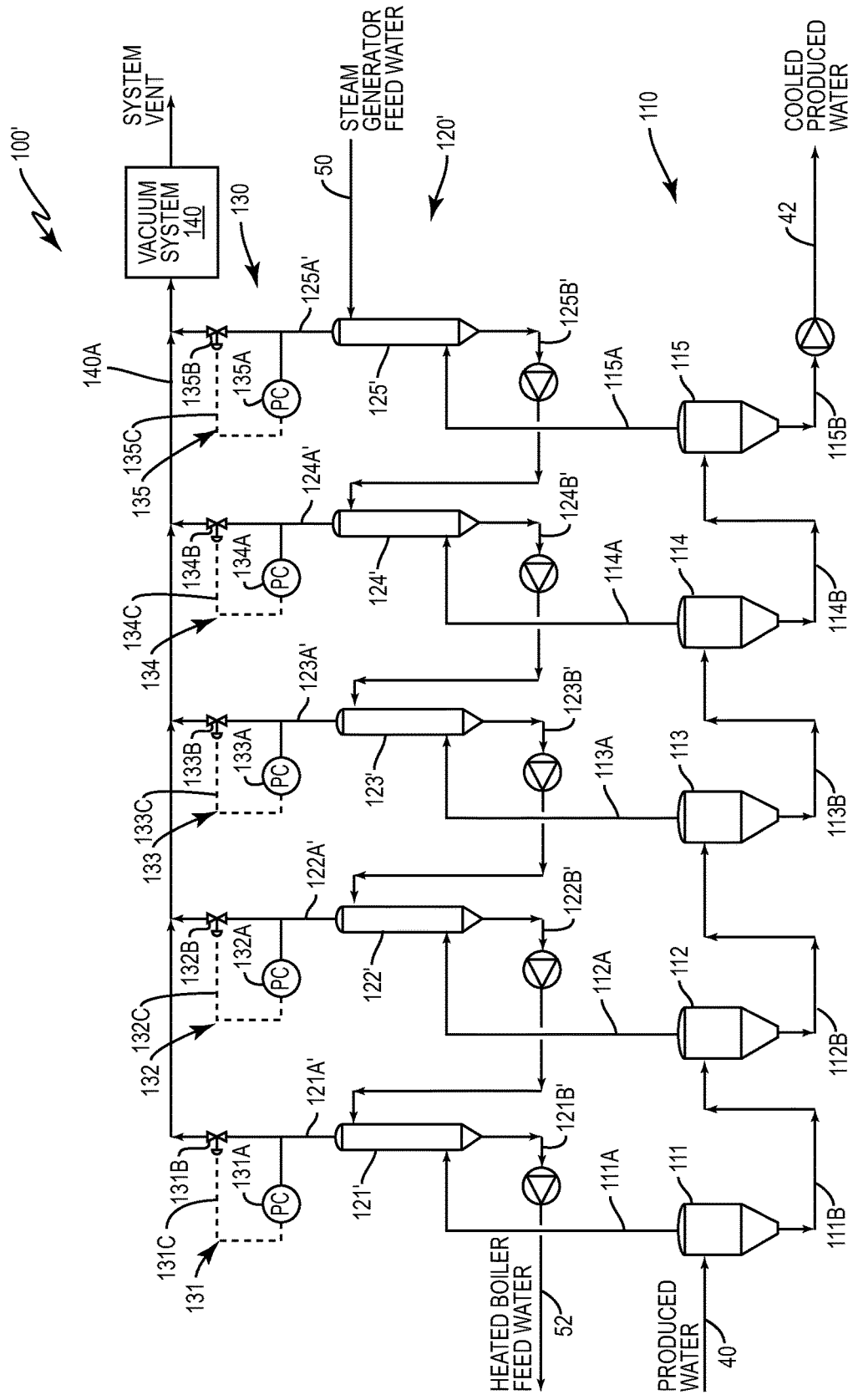
FIG. 4 is a schematic representation of a system for utilizing produced water to pre-heat steam generator feedwater by contact, direct heat transfer.

Considering first the embodiment illustrated in FIG. 3, cooling unit 100 comprises a series of flash bodies or flash evaporators 110, a corresponding series of condensers or heat exchangers 120, and a corresponding series of pressure control assemblies 130. Cooling unit 100 also includes a vacuum system 140 configured as described below to, in cooperation with the series of pressure control devices, maintain desired pressures within the cooling unit. Cooling unit 100 may be considered to comprise a number of stages, each stage including a separate flash evaporator, a corresponding heat exchanger or condenser, and a corresponding pressure control device. The number of stages may vary as described further below. For purposes of description only, cooling unit 100 will be considered to comprise five stages. Thus, and for descriptive purposes only and without limiting the numbers of stages that may be utilized in practicing the present invention, cooling unit 100 may be considered to comprise flash evaporators 111, 112, 113, 114, and 115; heat exchangers or condensers 121, 122, 123, 124, and 125; and pressure control devices 131, 132, 133, 134, and 135.

Considering now the operation of cooling unit 100, produced water 40 having a known initial produced water temperature (typically approximately 150° C.-200° C.) and initial contaminant concentration is admitted through a water inlet of flash evaporator 111 to a flash chamber thereof wherein the pressure is controlled at a level that is less than the water saturation pressure of the produced water at the initial produced water temperature. In response to the reduced pressure, a portion of the admitted produced water 40 vaporizes and is directed via line 111A to an inlet of heat exchanger 121. An unevaporated, or remaining portion of the admitted produced water is cooled to a first produced water temperature by the evaporation process. Further, due to the partial evaporation, the remaining produced water becomes more concentrated to a first concentration. The remaining cooled and concentrated produced water flows via line 111B to a flash chamber of flash evaporator 112.

The pressure in flash evaporator 112 is controlled at a level lower than the saturation pressure of the cooled and concentrated produced water at the first produced water temperature. In other words, the pressure in flash evaporator 112 is controlled such that the pressure is lower than the produced water entering the flash evaporator 112. That is the produced water undergoes a pressure drop between a point upstream of the inlet to flash evaporator 122 and the flash chamber contained within flash evaporator 112. The water thus admitted to the flash chamber of flash evaporator 112 undergoes flash evaporation where a portion of the water is vaporized and the vapor is directed via line 112A to condenser 122. Further cooled to a second produced water temperature less than the first produced water temperature and concentrated to a second contaminant concentration greater than the first concentration, the remaining liquid produced water is directed via line 112B and admitted to a flash chamber of flash evaporator 113. In this way it is appreciated that a series of vapor streams are directed from respective flash chambers of the series of flash evaporators (111-115) to respective heat exchangers or condensers 121-125.

More particularly, a first vapor stream at the first produced water temperature is directed from the flash chamber of flash evaporator 111 via line 111A to heat exchanger 121. A second vapor stream at the second produced water temperature is directed via line 112A from the flash chamber of flash evaporator 112 to heat exchanger 122. A third vapor stream at a third produced water temperature less than the second produced water temperature is directed from the flash chamber of flash evaporator 113 via line 113A to heat exchanger 123. A fourth vapor stream at a fourth produced water temperature less than the third produced water temperature is directed from flash evaporator 114 via line 114A to heat exchanger 124. And a fifth vapor stream at a fifth produced water temperature less than the fourth produced water temperature is directed from flash evaporator 115 via line 115A to heat exchanger 125.

Likewise, there is produced a series of sequentially cooled and concentrated produced water streams, each directed from one of the series flash evaporators to the flash chamber of a downstream flash evaporator. In particular, a first cooled produced water stream at the first produced water temperature is directed from flash evaporator 111 via line 111B to the flash chamber of flash evaporator 112. A second cooled produced water stream at the second produced water temperature is directed from flash evaporator 112 via line 112B to the flash chamber of flash evaporator 113. A third cooled produced water stream at the third produced water temperature is directed from flash evaporator 113 via line 113B to the flash chamber of flash evaporator 114. A fourth cooled produced water stream at the fourth produced water temperature is directed from flash evaporator 114 via line 114B to flash chamber of flash evaporator 115. A fifth cooled and concentrated produced water stream at the fifth produced water temperature is directed from flash evaporator 115 via line 115B and forms cooled produced water 42.

Turning now to the series of condensers or heat exchangers 120 and referring in particular to FIG. 3, it is appreciated that each heat exchanger unit forms a device having a vapor receiving compartment and a steam generator feedwater receiving compartment, the two compartments disposed to prevent fluid communication therebetween such that contents of the vapor receiving compartment are isolated from contents of the feedwater receiving compartment. The vapor receiving compartment includes a vapor inlet and two outlets, one for vapor that does not condense and one for condensed vapor, otherwise referred to as flash condensate. (The term "flash condensate" derives from the fact that the vapor which is condensed was produced by flashing produced water to vapor.) The vapor that does not condense while passing through the heat exchangers is drawn by the vacuum system 140 away from the heat exchangers.

The feedwater receiving compartment of each of the series of heat exchangers or condensers includes an inlet for steam generator feedwater and an outlet for steam generator feedwater that has been heated in the heat exchanger or condenser unit by heat transferred from the vapor. The two compartments share a structure that includes surfaces disposed in each compartment. Vapor adjacent the surfaces disposed in the vapor receiving compartment heats the structure and a portion of the heat is conducted through the structure to surfaces thereof in the feedwater receiving compartment. From thence, the heat is transferred to the steam generator feedwater in the feedwater receiving compartment.

Each heat exchanger receives vapor from a corresponding flash evaporator as described above. Likewise, steam generator feedwater is supplied to each heat exchanger in the series. Steam generator feedwater supplied to each heat exchanger is generally colder than is the vapor provided thereto. It is appreciated that steam generator feedwater is supplied to a first of the series of heat exchangers, passes through the heat exchanger and thence to a second exchanger of the series, and so forth. That is, insofar as the flow of steam generator feedwater is concerned, the series of heat exchangers are connected in series. Thus, as steam generator feedwater passes through the feedwater receiving compartment of each heat exchanger, the steam generator feedwater is heated by heat transferred from the vapor that passes through the vapor receiving compartment. Consequently, the vapor passing through the vapor receiving compartment of each heat exchanger is cooled, and the cooling is generally to the extent that a portion of the vapor condenses to form the flash condensate while a remaining uncondensed portion is drawn from the heat exchanger by vacuum system 140.

The flash concentrate from each heat exchanger or condenser may be flashed with the produced water into the succeeding condenser in the series to increase the temperature of the steam generator feedwater. Alternatively, the flash condensate from each condenser may be blended with the flash condensate from the other condensers in the series. Depending on the quality of the blended flash concentrate, which quality depends on the level of volatile components in the produced water, the blended flash concentrate may be recombined with the produced water or treated and combined with the steam generator feedwater.

Regarding the flow of uncondensed vapor from the heat exchangers, it is seen in FIG. 3 that the vapor from each of the heat exchangers is collected together in line 140A and directed through vacuum system 140 and vented from cooling unit 100. In particular, uncondensed vapor from heat exchanger 121 is directed via line 121A to line 140. Uncondensed vapor from heat exchanger 122 is directed via line 122A to line 140. Uncondensed vapor from heat exchanger 123 is directed via line 123A to line 140. Uncondensed vapor from heat exchanger 124 is directed via line 124A to line 140. And uncondensed vapor from heat exchanger 125 is directed via line 125A to line 140. It is appreciated that line 121A, the vapor receiving compartment of heat exchanger 121, line 121A, and the flash chamber of flash evaporator 111 are in fluid communication such that the pressure in the flash chamber of flash evaporator 111 may be controlled by controlling the pressure in line 121A. Further, the pressure in the flash chamber of flash evaporator 112 may be controlled by controlling the pressure in line 122A, and likewise for the other flash chambers. The manner in which the pressure controllers and vacuum system 140 cooperate to provide control of the pressures in the flash chambers of the flash evaporators will be discussed below.

Before discussing pressure control, it is useful to consider in more detail how steam generator feedwater 50 is preheated in cooling unit 100. Steam generator feedwater 50 at an initial feedwater temperature is directed into the steam generator feedwater inlet of what might be considered to be the last or final heat exchanger, heat exchanger 125. Steam generator feedwater 50 passes through the feedwater receiving compartment thereof and is heated in the process to a first feedwater temperature that is greater than the initial feedwater temperature. The steam generator feedwater at the first feedwater temperature exits heat exchanger 125 and is directed via line 125B to the inlet of heat exchanger 124, where in passing therethrough it is heated to a second feedwater temperature greater than the first temperature. Feedwater at the second feedwater temperature is directed from heat exchanger 124 via line 124B into heat exchanger 123 and heated in passing therethrough to a third feedwater temperature greater than the second feedwater temperature. Feedwater at the third feedwater temperature is directed via line 123B to heat exchanger 122 where the feedwater is heated to a fourth feedwater temperature greater that the third temperature. Feedwater at the fourth temperature is directed via line 122B to heat exchanger 121 where the feedwater is heated to a fifth feedwater temperature greater than the fourth feedwater temperature. Feedwater at the fifth feedwater temperature is directed from heat exchanger 121 via line 121B and forms preheated steam generator feedwater 52.

Regarding pressure control, as shown in FIG. 3, each of the pressure control devices 131-135 is in fluid communication with a corresponding vapor compartment of one of the heat exchangers. Each pressure control device may be any of various well known designs including but not limited to self-regulating pressure control valves, a PID-type pressure control loop, or any of various other well-known pressure control systems. In one embodiment, each pressure control device 130 comprises a PID-type pressure controller and a variable flow valve, the controller and the valve interconnected such that the controller can adjust the valve to produce a preset or otherwise determined pressure in a confined volume to which the controller and valve are connected. In particular, pressure control device 131, comprises PID-type pressure controller 131A and valve 131B. Pressure controller 131A is connected so as to be in fluid communication with line 121A, and is connected with valve 131B via control line 131C so that the controller may issue commands to the valve and thereby control the valve. Valve 131B is deployed in series in line 121A such that fluid flow in line 121A is controlled by the valve. Similarly connected and deployed with line 122A is control device 132 with controller 132A, valve 132B, and control line 132C; with line 123A is control device 133 with controller 133A, valve 133B, and control line 133C; with line 124A is control device 134 with controller 134A, valve 134B, and control line 134C; and, with line 125A is control device 135 with controller 135A, valve 135B, and control line 135C.

As noted above, the operating pressure in each flash stage may be controlled by a number of means, including the use of pressure controllers and pressure control valves located on the vent streams of each condenser stage (as depicted). Alternatively the pressure controllers and pressure control valves may be replaced with restriction orifices and/or manual valves in order to achieve the desired pressure profile. In the latter case the pressure of the last stage may be allowed to be equal to the pressure of the vacuum system (i.e. with no control) or may be controlled with a pressure controller and a pressure control valve on the last stage condenser vent or on a bypass around the vacuum system.

In one embodiment, the pressures to be controlled in cooling unit 100 are maintained by vacuum system 140 operating in concert with the series of pressure control devices. This embodiment is generally applicable in cases in which produced water 40 is supplied to cooling unit 100 at or near atmospheric pressure and at a temperature at or below the boiling point of the produced water. As such, vacuum system 140 may provide a pressure in the flash chamber of flash evaporator 111 that is lower than the saturation pressure for the produced water at the initial temperature. From the foregoing description, considering pressure control devices 131, 132, 133, 134, and 135 in order and the flash chambers of flash evaporators 111, 112, 113, 114, and 115 in corresponding order it is appreciated that each pressure control device will be set to control the pressure in the associated flash chamber at a pressure lower than the pressure in the preceding chamber. Thus, vacuum system 140 is capable of developing and maintaining a vacuum, or pressure level below atmospheric pressure, at least as low as the pressure required in the flash chamber of flash evaporator 115. Valves 131B, 132B, 133B, 134B, and 135B in order are adjusted by their respective pressure controllers to maintain successively decreasing pressures (increasing vacuum).

Turning now to the methods that might be used to determine the pressures at which each of the flash chambers are controlled, in one embodiment the pressures might be determined based on experience in view of the desired total amount of produced water cooling or steam generator preheating desired, and based on expected characteristics of the produced water. If, for example, the saturation pressure characteristic of the water is well known, the saturation pressure characteristic might be expressed in the form of a tabulation of saturation pressure versus temperature. If the initial produced water temperature is known and the desired final cooled produced water temperature is known, then, if the number of stages in cooling unit 100 is five, for example, a series of five temperature drops could be determined to accomplish the desired final cooled produced water temperature. Thus, one would have a series of water temperatures, beginning with the initial produced water temperature, each being the temperature of produced water entering a separate flash evaporator. For each temperature the saturation pressure can be determined from the known saturation characteristic of water, and a pressure increment below each saturation pressure could be determined by experience and applied to the saturation pressure at that stage to determine the required pressure to be maintained in the flash chamber for that stage. Thus a preset separate desired pressure could be programmed into each of the pressure controllers.

Alternatively, the pressure controllers might include functionality and connectivity to sense the actual temperatures of the produced water entering the flash evaporators. With the sensed temperature for produced water entering one of the flash evaporators, the corresponding pressure controller would be programmed to look up the water saturation pressure from the known characteristic and determine the saturation pressure of the water entering the flash evaporator. A pressure increment could then be applied to determine the pressure to which the controller controls the pressure in the flash evaporator.

An alternate embodiment of the present invention is illustrated in FIG. 4 and referred to generally by the numeral 100'. The series of indirect or non-contact heat exchangers or condensers of FIG. 3 are replaced in FIG. 4 by a series of direct or contact-type heat exchangers or condensers 120'. In all aspects other than the operation of the series of heat exchangers 120', the embodiment of FIG. 4 functions in accordance with the foregoing description of the embodiment of FIG. 3.

Regarding the series of direct heat exchangers or condensers 120', it is appreciated that each heat exchanger or condenser includes a single compartment into which both vapor generated from an associated flash evaporator and steam generator feedwater 50 are directed and mixed. As illustrated in FIG. 4, and referring in particular to heat exchanger 125', steam generator feedwater 50 at an initial feedwater temperature is directed into a steam generator feedwater inlet disposed in an upper portion of the heat exchanger while vapor produced from produced water in flash evaporator 115 is directed to a vapor inlet in a lower portion of the exchanger or condenser. Such a configuration may promote mixing of vapor and feedwater by countercurrent motion. Other inlet configurations and mixing actions may be utilized, however. Notwithstanding, as the vapor and feedwater mix within heat exchanger 125', heat is transferred. The vapor is cooled and the feedwater is heated to the first feedwater temperature. Generally the vapor is cooled sufficiently such that a portion of the vapor condenses and the associated latent heat is released to heat the feedwater further. The resulting condensate from the flash vapor joins and becomes intermixed with the steam generator feedwater, thereby contributing to increased steam generator feedwater flow from heat exchanger 125'. This process is repeated as the steam generator feedwater passes from heat exchanger 125' through heat exchangers 124', 123', 122', and 121'. In particular, steam generator feedwater at the first feedwater temperature is directed via line 125B' to the feedwater inlet of heat exchanger 124' where the feedwater is heated to the second feedwater temperature. Steam generator feedwater passes via line 124B' from heat exchanger 124' to heat exchanger 123' where the feedwater is heater to the third feedwater temperature. Steam generator feedwater passes via line 123B' from exchanger 123' to exchanger 122' where the steam generator feedwater is elevated to the fourth feedwater temperature. Steam generator feedwater is passed via line 122B' from exchanger 122' to exchanger 121' where the feedwater temperature is elevated to the fifth feedwater temperature, and passes via line 121B' and forms preheated feedwater 52.

As heretofore described, cooling unit 100, functions in both the FIG. 3 and the FIG. 4 embodiments to successively, in a stepwise fashion, expose the produced water stream to successively lower pressures (vacuums) as the produced water stream passes from flash evaporator 111 through flash evaporator 115. Further, cooling unit 100 functions to increase the steam generator feedwater temperature in a generally stepwise fashion as the feedwater passes from heat exchanger 125 to exchanger 121. It is also appreciated from the foregoing description that liquid produced water and vapor evolved therefrom flows through cooling unit 100 in a generally countercurrent fashion relative to the steam generator feedwater flowing therethrough.

The embodiment of FIG. 3 might be appropriate in situations where produced water 40 is known to contain volatile material that will evaporate with the water and become part of the vapor. Such volatile material is undesirable in steam generator feedwater and would be prevented from entering the feedwater by the indirect, non-contact heat transfer method embodied in heat exchangers 120. On the other hand, when produced water 40 is known to not comprise such volatile material, the method of FIG. 4, embodied in the series of heat exchangers 120' may be used. In each of the embodiments of FIGS. 3 and 4, it is appreciated that produced water (liquid form) does not impinge on heat exchanger or condenser heat transfer surfaces and the effectiveness of these devices is thus not compromised.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of recovering oil and cooling produced water comprising:
    recovering an oil-water mixture from an oil-bearing formation;
    separating the oil from the oil-water mixture to yield the produced water;
    directing the produced water through a plurality of flash evaporators connected in series;
    cooling the produced water as the produced water flows through the series of flash evaporators by varying the pressure in the flash evaporators such that the produced water experiences successive pressure drops in the flash evaporators as the produced water flows through the plurality of flash evaporators, causing a portion of the produced water in each flash evaporator to be converted to vapor;
    preheating a steam generator feedwater by transferring heat from the vapor to the steam generator feedwater;
    after preheating the steam generator feedwater, directing the steam generator feedwater to a steam generator and generating steam; and
    injecting the steam into the oil-bearing formation or injection well.

2. The method of claim 1 including directing the steam generator feedwater through a series of heat exchangers and wherein each flash evaporator produces a vapor stream, the method including directing the vapor streams from the flash evaporators to the series of heat exchangers and transferring heat from the vapor streams to the steam generator feedwater passing through the series of heat exchangers.

3. The method of claim 1 including controlling the pressure in the flash evaporators such that one or more of the flash evaporators are operated at a lower pressure than a preceding flash evaporator relative to the flow of produced water through the flash evaporators.

4. The method of claim 3 including controlling the pressure in each flash evaporator by a pressure controller that is operative to control a control valve that is communicatively connected to a respective flash evaporator.

5. The method of claim 1 wherein each flash evaporator produces a vapor stream that is directed to and through a heat exchanger and from the heat exchanger to a pressure control device that controls the pressure within the flash evaporator that produced the vapor stream.

6. The method of claim 1 wherein the series of flash evaporators form a produced water cooling unit and wherein, in addition to the series of flash evaporators, the cooling unit includes a series of heat exchangers and a series of pressure control devices wherein one flash evaporator, one heat exchanger, and one pressure control device forms a single stage in the cooling unit; and the method includes directing the produced water from one flash evaporator to another flash evaporator and in the process cooling the produced water and concentrating the produced water; producing a vapor stream in each flash evaporator and directing the vapor stream to and through one heat exchanger and to the pressure control device of a single stage; directing the steam generator feedwater through a series of the heat exchangers and transferring heat from the vapor streams to the steam generator feedwater; employing the vapor streams directed from the heat exchangers to control the pressure in the flash evaporators such that the pressure in the flash evaporators decrease from one flash evaporator to another flash evaporator in the direction of the flow of the produced water therethrough.

7. A method of recovering oil from an oil-bearing formation comprising:
    recovering an oil-water mixture from the oil-bearing formation;
    separating the oil from the oil-water mixture to produce the oil and produced water;
    directing a feedwater to a steam generator and producing steam;
    injecting the steam into the oil-bearing formation or an injection well;
    evaporating a portion of the produced water to produce a vapor by directing the produced water through a plurality of flash evaporators and causing a portion of the produced water in each flash evaporator to be converted to the vapor;
    transferring heat from the vapor to the feedwater so as to heat the feedwater prior to the feedwater reaching the steam generator; and
    wherein transferring heat from the vapor to the feedwater includes directing the vapor and the feedwater to a heat exchanger and transferring heat from the vapor to the feedwater in the heat exchanger.

8. The method of claim 7 including isolating the vapor from the feedwater by directing the vapor to one side of the heat exchanger and directing the feedwater to another side of the heat exchanger and transferring heat from the vapor on one side of the heat exchanger to the feedwater on the other side of the heat exchanger.

9. The method of claim 7 wherein evaporating a portion of the feedwater to produce the vapor includes directing the produced water through a series of flash evaporators and flash evaporating a portion of the produced water in each flash evaporator to produce a series of vapor streams; and transferring heat from the vapor streams to the feedwater.

10. The method of claim 9 including directing each vapor stream to a separate heat exchanger and directing the feedwater through each of the heat exchangers where heat is transferred from the vapor streams to the feedwater.

11. The method of claim 7 wherein evaporating a portion of the produced water includes:
    directing the produced water through a series of flash evaporators and producing a series of vapor streams;

directing each vapor stream to a separate heat exchanger; and flowing the feedwater through the heat exchangers in a direction that is counter to the direction of flow of the produced water through the series of flash evaporators.

12. The method of claim 7 wherein evaporating a portion of the produced water to produce a vapor includes:
    directing the produced water into a first flash evaporator and producing a first vapor stream and a first cooled produced water stream;
    directing the first cool produced water stream to a second flash evaporator and producing a second vapor stream and a second cooled produced water stream; and
    controlling the pressure in the first and second flash evaporators such that the pressure in the second flash evaporator is less than the pressure in the first evaporator.

13. The method of claim 12 wherein there is provided three or more flash evaporators including the first and second flash evaporators and a last flash evaporator; and wherein the method includes sequentially decreasing the pressure in each flash evaporator from the first flash evaporator to the last flash evaporator.

14. The method of claim 13 wherein the last flash evaporator produces a last cooled produced water stream and the method includes directing the last cooled produced water stream to a produced water treatment unit.

15. The method of claim 7 wherein evaporating a portion of the produced water to produce the vapor includes directing the produced water to the plurality of flash evaporators and controlling the pressure in the flash evaporators with a vacuum system.

16. The method of claim 15 including controlling the pressure in the flash evaporators such that the pressure in the flash evaporators is less than the saturation pressure of the produced water in the flash evaporators.

17. The method of claim 15 wherein there is provided a pressure control valve operatively connected between the vacuum system and the flash evaporators and the method includes controlling the pressure in the flash evaporators via the pressure control valve.

18. A system for cooling produced water separated from a recovered oil-water mixture and pre-heating a steam generator feedwater used for generating steam for injection into an oil-bearing formation, the system comprising:
    an oil-water separation unit for receiving the recovered oil-water mixture and separating the oil from the oil-water mixture to produce oil and the produced water;
    a cooling unit comprising a series of operatively interconnected stages with each stage comprising:
      i. a flash evaporator having an inlet, outlet and a flash chamber;
      ii. a heat exchanger operatively connected to the flash evaporator for receiving vapor produced by the flash evaporator;
      iii. a pressure control circuit operatively connected to the heat exchanger and operative to control the pressure in the flash chamber;
    a steam generator for generating steam for injection into the oil-bearing formation;
    a produced water cooling line operatively connected to the flash evaporators of the stages for directing the produced water to the flash evaporators and cooling the produced water and producing the vapor;
    a first vapor line for directing the vapor from each flash evaporator to one of the heat exchangers;
    a second vapor line for directing the vapor from each heat exchanger to one of the pressure control circuits;
    a steam generator feedwater line for directing the feedwater to the heat exchangers where heat is transferred from the vapor in the heat exchangers to the feedwater; and
    wherein the pressure control circuit decreases the pressure from one flash evaporator to another flash evaporator and wherein succeeding pressure drops occur in the flash evaporators in the direction of flow of the produced water through the flash evaporators.

19. The system of claim 18 wherein the pressure control circuits include a vacuum unit and a series of pressure control valves disposed between the vacuum unit and the flash evaporators and wherein the vacuum unit and the pressure control valves cooperate to control the pressure in the flash evaporators.

20. The system of claim 18 wherein each pressure control circuit of each stage is in fluid communication with a vapor compartment of one of the heat exchangers.

21. The system of claim 20 wherein the pressure control circuit includes a controller and a valve and wherein the controller is operative to adjust the valve which is in fluid communication with the vapor compartment of one of the heat exchangers and in fluid communication with the flash chamber of one of the flash evaporators.

22. The system of claim 21 wherein the pressure control circuit includes a vacuum system that operates in concert with the controllers and the valves and wherein the vacuum system, controllers and valves controls the pressure within the flash chambers of the flash evaporators.

23. The system of claim 18 wherein the pressure control circuit provides a pressure in each flash chamber of the flash evaporators that is lower than the saturation pressure at the temperature of the produced water entering the respective flash evaporator.

24. The system of claim 18 wherein each heat exchanger includes a compartment for receiving both the vapor and the steam generator feedwater and wherein the vapor directly heats the feedwater.

25. A system for cooling produced water separated from a recovered oil-water mixture and preheating a steam generator feedwater used for generating steam for injection into an oil-bearing formation, the system comprising:
    an oil-water separation unit for receiving the recovered oil-water mixture and separating oil from the oil-water mixture to produce oil and the produced water;
    one or more flash evaporators for receiving the produced water and cooling the produced water by flash evaporating the produced water to produce vapor and cooled produced water;
    one or more heat exchangers for receiving the vapor produced by the one or more flash evaporators;
    a steam generator for generating steam for injection into the oil-bearing formation;
    a steam generator feedwater line for feeding the feedwater to the steam generator;
    the steam generator feedwater line configured to direct the feedwater through the one or more heat exchangers prior to the feedwater reaching the steam generator wherein heat is transferred from the vapor to the steam generator feedwater; and
    wherein the heat exchanger isolates the vapor from the steam generator feedwater and heat is transferred from the vapor to the steam generator feedwater.

26. The system of claim 25 including a pressure controlled subsystem for controlling the pressure in the one or more flash evaporators.

27. The system of claim 26 wherein the pressure controlled subsystem includes a vacuum unit and a pressure control valve disposed between the vacuum unit and the flash evaporator and wherein the vacuum unit and pressure control valve cooperate to control the pressure in the flash evaporator.

28. The system of claim 25 wherein the system includes a series of flash evaporators configured to permit the produced water to flow through each of the flash evaporators; and wherein each flash evaporator produces a vapor stream and a cooled produced water stream.

29. The system of claim 28 wherein the system includes a series of heat exchangers and wherein each heat exchanger is operatively connected to a flash evaporator such that the vapor stream produced by each flash evaporator is directed to one heat exchanger; and wherein the steam generator feedwater line is configured to direct the steam generator feedwater through each of the heat exchangers.

30. The system of claim 29 wherein the system is configured such that the produced water flowing through the flash evaporators and the steam generator feedwater flowing through the heat exchangers flow in counter directions.

31. A method of recovering oil and cooling produced water comprising:

recovering an oil-water mixture from an oil-bearing formation;

separating oil from the oil-water mixture to yield the produced water;

directing the produced water through a plurality of flash evaporators connected in series;

cooling the produced water as the produced water flows through the series of flash evaporators by varying the pressure in the flash evaporators such that the produced water experiences successive pressure drops in the flash evaporators as the produced water flows through the plurality of flash evaporators, causing a portion of the produced water in each flash evaporator to be converted to vapor;

preheating a steam generator feedwater by transferring heat from the vapor to a steam generator feedwater;

after preheating the steam generator feedwater, directing the steam generator feedwater to a steam generator and generating steam;

injecting the steam into an oil-bearing formation or injection well; and wherein each flash evaporator produces a vapor stream that is directed to and through a heat exchanger and from the heat exchanger to a pressure control device that controls the pressure within the flash evaporator that produced the vapor stream.

* * * * *